(12) United States Patent
Gosis et al.

(10) Patent No.: US 6,553,878 B2
(45) Date of Patent: Apr. 29, 2003

(54) ROTARY TORSION CUTTING APPARATUS

(75) Inventors: Anatoly Gosis, Palatine, IL (US); Lee A. Sheridan, Barrington, IL (US); G. Michael Velan, Mt. Prospect, IL (US); Thomas J. Nelson, Belton, TX (US)

(73) Assignee: Premark RWP Holdings, Inc., Wilmington, DE (US)

( * ) Notice: Subject to any disclaimer, the term of this patent is extended or adjusted under 35 U.S.C. 154(b) by 0 days.

(21) Appl. No.: 09/682,515

(22) Filed: Sep. 13, 2001

(65) Prior Publication Data

US 2003/0047043 A1 Mar. 13, 2003

(51) Int. Cl.7 ................................................. B26D 1/00
(52) U.S. Cl. ............................................. 83/13; 83/199
(58) Field of Search ........................ 83/199, 196, 200, 83/13

(56) References Cited

U.S. PATENT DOCUMENTS

| | | | | |
|---|---|---|---|---|
| 146,846 A | * | 1/1874 | Stevens ........................ 30/164 |
| 260,173 A | * | 6/1882 | Durfee ......................... 83/199 |
| 690,083 A | * | 12/1901 | Stolpe ......................... 83/199 |
| 1,265,345 A | * | 5/1918 | La Rock ....................... 83/200 |
| 2,428,650 A | * | 10/1947 | Brunner ....................... 83/199 |
| 2,638,985 A | | 5/1953 | Ross |
| 2,649,913 A | * | 8/1953 | Linder ......................... 269/306 |
| 3,370,353 A | * | 2/1968 | Weissman et al. ............. 30/233 |
| 3,494,233 A | | 2/1970 | Kojima |
| 4,003,279 A | * | 1/1977 | Carmichael et al. ........... 82/54 |
| 4,422,238 A | * | 12/1983 | Kloster ........................ 30/101 |
| 4,676,128 A | * | 6/1987 | Kawasaki ..................... 82/58 |
| 4,958,434 A | | 9/1990 | Marschner |
| 5,261,303 A | | 11/1993 | Strippgen |
| 5,590,467 A | * | 1/1997 | Schloetzer ................... 29/889.21 |
| 5,988,027 A | * | 11/1999 | Lenox .......................... 83/13 |
| 6,058,820 A | * | 5/2000 | Rinner ......................... 30/253 |

* cited by examiner

Primary Examiner—Allan N. Shoap
Assistant Examiner—Jason Prone
(74) Attorney, Agent, or Firm—Welsh & Flaxman LLC

(57) ABSTRACT

Disclosed herein is a unique torsional cutting apparatus. Two plates, referred to as a stationary and rotating plate member, are positioned and held in place next to each other using any convention means such as spring tensioned bolts. There is a zero gap between the two plate members. A hole in the general shape of the object to be cut is fashioned through the two plate members so that the object to be cut can be placed into and through the hole. The hole is tapered towards the center of the rotary torsion cutting apparatus thereby allowing ease of insertion, a more precise cut, and the elimination of burring.

14 Claims, 16 Drawing Sheets

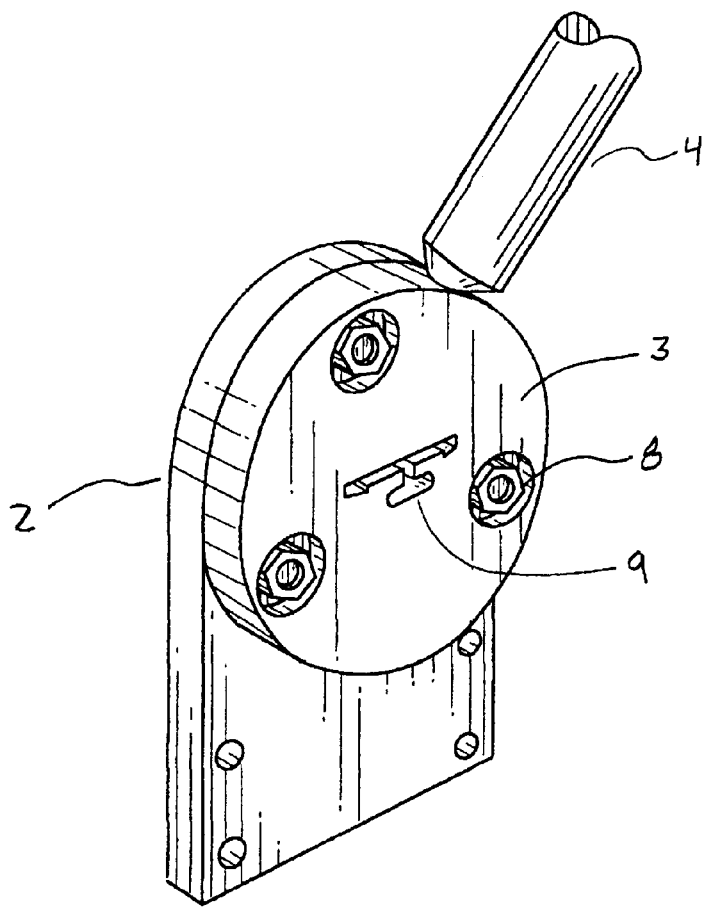
Fig. 1a
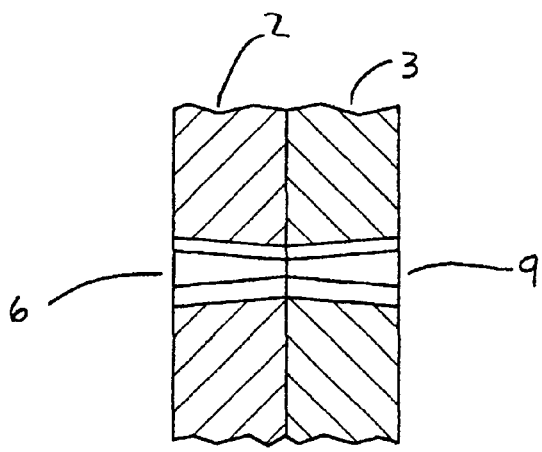
PARTIAL CROSS SECTION OF FIG. 1

ROTARY TORSION CUTTING APPARATUS

TECHNICAL FIELD

The present invention relates to a cutting device employing torsion.

BACKGROUND OF INVENTION

Most mechanics, professional installers and even "do it yourselfer's" have come across the need to cut metal stock or PVC pipe. It is not uncommon that when installing a typical suspended ceiling, the metal tracks which support the ceiling tile must be cut. Even physicians employ cutting devices when sizing metal tubes and the like, for implant into the human body. In these situations, there is a strong desire to find that "perfect tool" which will handle the cutting in a simple, fast and economic way.

Cutting devices are well known in the art and range in complexity from the very simple to extremely elaborate. They are used in a variety of applications including the medical, construction, plumbing and electrical fields. Scissors are an example of a simple cutting device and include any device wherein a pair of rods rotate around a fixed pivot point. At one end of the rods are the handles that are closed together while at the other end are the blades which accomplish the cutting. Generally, material is placed between the blades of the scissors, at least one of which has been sharpened to a cutting edge and is offset from the other. The blades are then closed together using the handles, shearing the material. Well known in the art is the fact that shearing requires some amount of gap between the cutting edges, otherwise, the shear force necessary would render the cutting device practically useless. A severe disadvantage of the necessary "gap" is the burring which results on the cut edge as well as possible sources of material which could foul the cutting device. Further complicating the structure and operation of the cutting devices of the prior art is the fact that generally, in order to perform the cut, a rotational bearing is required which necessitates a housing feature. Examples of this type of cutting device is found in the disclosure of U.S. Pat. Nos. 5,261,303, 4,958,434, 3,494,233 and 2,638,985.

Unlike the afore-referenced prior art, the present invention utilizes a rotary torsion mechanism to achieve the requisite mechanical force. One of the advantages of using a twisting or torsional force to achieve a cut is the amount of force required, unlike the shear mechanism in a pair of scissors, is substantially reduced. Material to be cut is positioned in the rotary torsion cutting apparatus of the present invention so that its sectional inertial center coincides with the rotational axis. The torsion cutting force of the present invention is approximately 7.25 times more powerful than the shear force generated in connection with typical shear cutting devices.

Further, unlike the prior art, there is a zero gap between the cutting edges of the present invention. This "zero gap" feature eliminates burring, prevents fouling, eliminates the need for a housing (consequently any bearing feature) and in all cases except for hollow round material, eliminates the need for any off-set.

It is the object of this invention to provide a simple, effective and inexpensive way to cut materials such as metal as well as PVC and copper pipe.

It is a further an object of this invention to provide a burr free cut.

SUMMARY OF INVENTION

Unlike the prior art which disclose shear type mechanisms, the present invention relates to a unique torsional cutting apparatus. Two plates, referred to as a stationary and rotating plate member, are positioned and held in place next to each other using any conventional means such as spring tensioned bolts such that there is a zero gap between the two plate members. The bolts are positioned through the rotating plate member and fastened to the corresponding threaded holes located on the stationary plate member. To allow rotation, the bolt holes on the rotating plate member have been elongated. The size and location of the elongated bolt holes determine both the point at which rotation begins as well as the point at which rotation stops. Further, the start position serves to align the two plates.

A fenestration or opening in the general shape of the object to be cut is fashioned through the two plate members so that the object to be cut can be placed into and through the opening. Although tapering of the opening is not required, the opening in the preferred embodiment of the present invention is tapered towards the center of the rotary torsion cutting apparatus thereby allowing ease of insertion, a more precise cut, the elimination of burring and a more defined cutting edge should the need for periodic sharpening arise. While any amount of tapering could be employed, it has been found that tapering of between 0.025 inches and 0.035 inches is the best while 0.031 inches is the preferred.

The torsional cutting apparatus of the present invention employs a torsion severance method, meaning, the opening and consequently, the object to be cut are located in the apparatus such that its inertial center coincides with the rotational axis of such apparatus thereby eliminating the need for any offset between the two plate members. Only in the instance where the object being cut is circular will any offset be required and in such case only such offset as necessary to generate sufficient cutting action is required. In cases where a hollow object is to be cut, a solid insert can be placed into such object prior to cutting to eliminate deflection and deformation of the object walls. Use of a torsional cutting force increases the amount of force generated to approximately 7.25 times that force which is generated with traditional shear devices.

Any means of causing the rotating plate member to rotate can be used, however, in the present invention, a handle attached to such plate member is employed. The handle is turned causing the rotating plate member to rotate around the inertial center of the object being cut. The handle must be rotated sufficient to achieve the desired cut, which in the preferred embodiment has been found to have been at least 90 degrees. While the type as well as number of bolts may be varied to fit particular circumstances, the present invention uses three spring tensioned bolts, placed through holes on the rotating plate member into corresponding holes located on the stationary plate member and tightened. Although the specific size and shape of the bolt holes can be changed, the size and shape of such holes of the present invention are such that the bolts may only be rotated 90 degrees.

BRIEF DESCRIPTION OF DRAWINGS

FIG. 1a depicts both the present invention as assembled as well as a partial cross section of tapered opening.

DETAILED DESCRIPTION

Figure 1:
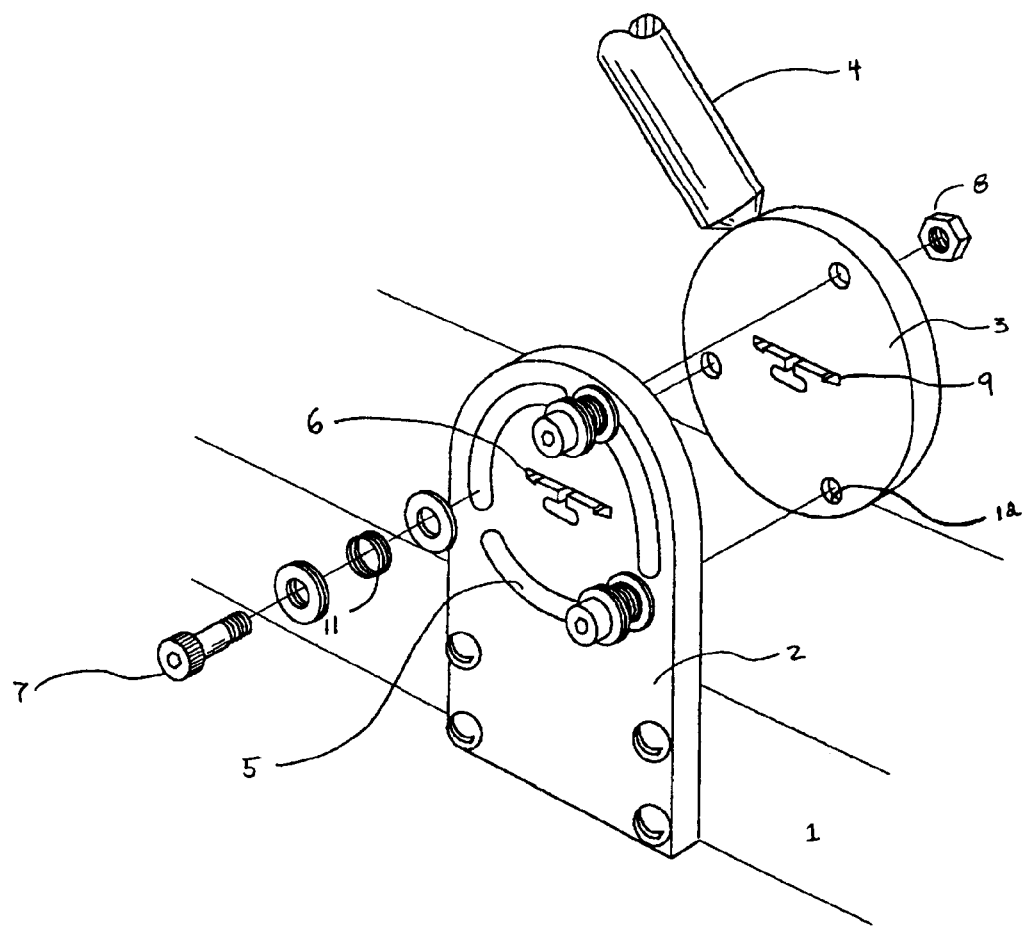
FIG. 1 shows an isometric, exploded view of the rotary torsion cutting apparatus of the present invention.

As shown in FIG. 1, the rotary torsion cutting apparatus of the present invention comprises a rotating plate member (3) and a stationary plate member (2), movably positioned next to each other. A fixed (6) opening is located on the stationary plate member (2) and a corresponding pivot (9) opening is fashioned into the rotating plate member (3). While the present invention can be constructed to function as a hand held, portable tool, the preferred embodiment is attached to a base (1) of any rigid material such as wood, metal, plastic, using any conventional attachment means.

The rotary torsion cutting apparatus of the present invention does not require a bearing assembly and there is a zero gap between the rotating and stationary plate member. Although any means can be used to movably position the rotating plate member to the stationary plate member, the preferred embodiment of the present invention utilizes at least two, preferably three bolts (7), each of which is spring tensioned (11). While the stationary (2) and rotating (3) plate members could be of any shape or dimension, the present invention utilizes cylindrical shaped plate members. It is possible to rotate the rotating plate member using any conventional source of mechanical, electrical, magnetic, hydraulic or pneumatic power. In the preferred embodiment of the present invention, the rotation of the rotating plate member (3) is effectuated by manually pushing or pulling a handle (4) attached to such member.

Well known in the art is the fact that any time a piece of material is sheared, the edges of the cut material are rough or "burred." The present invention eliminates burning by utilizing a zero gap between the rotating (3) and stationary plate member (2). Although any conventional means can be utilized to movably fasten the stationary plate member (2) to the rotating plate member (3), stationary (2) and rotating plate member (3) of the present invention are movably attached to each other using three bolts (7). The bolts are placed through bolt holes (5) on the stationary plate member (2) and tightened into corresponding threaded holes (12) located on the rotating plate member (3). A lock nut (8) is used to secure the bolts (7) in place. The placement of the bolt holes are such that, the fixed (6) and pivot openings (9) are aligned prior to rotation. The size and location of the bolt holes on the rotating plate member dictates the degree of rotation which in the present invention, is preferred to be at least 90 degrees.

Figure 2A:
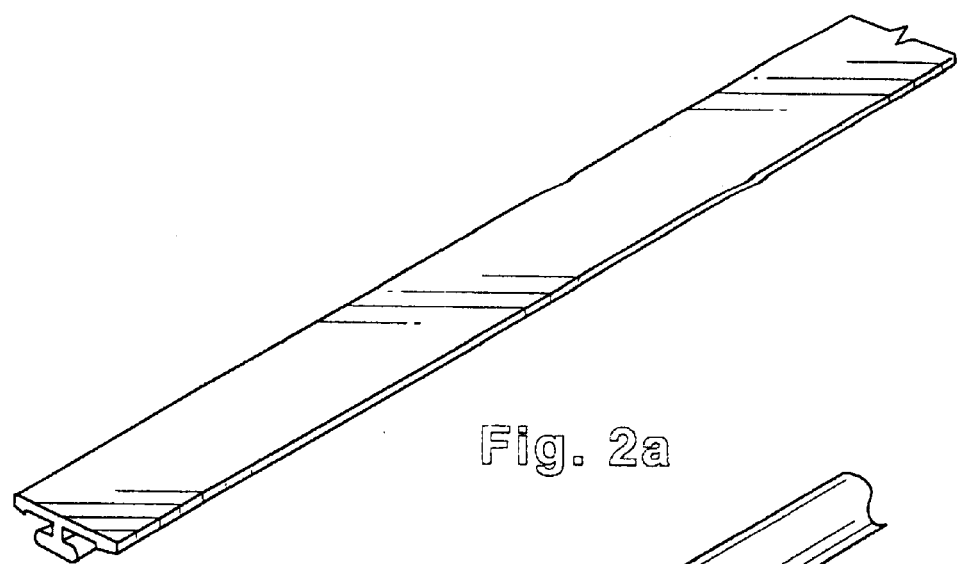
FIG. 2a–2c illustrate examples of the various shapes which can be cut using the present invention.
Figure 2B:
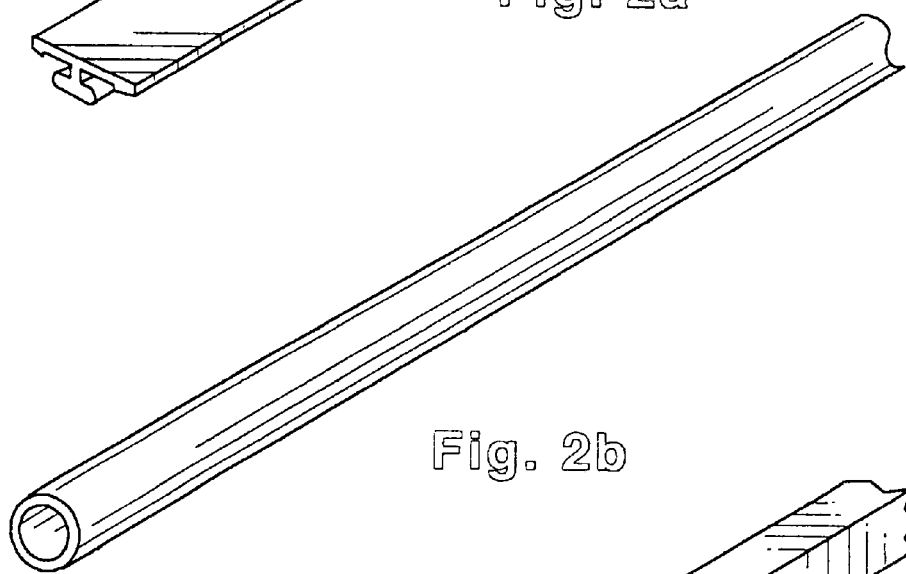
Figure 2C:
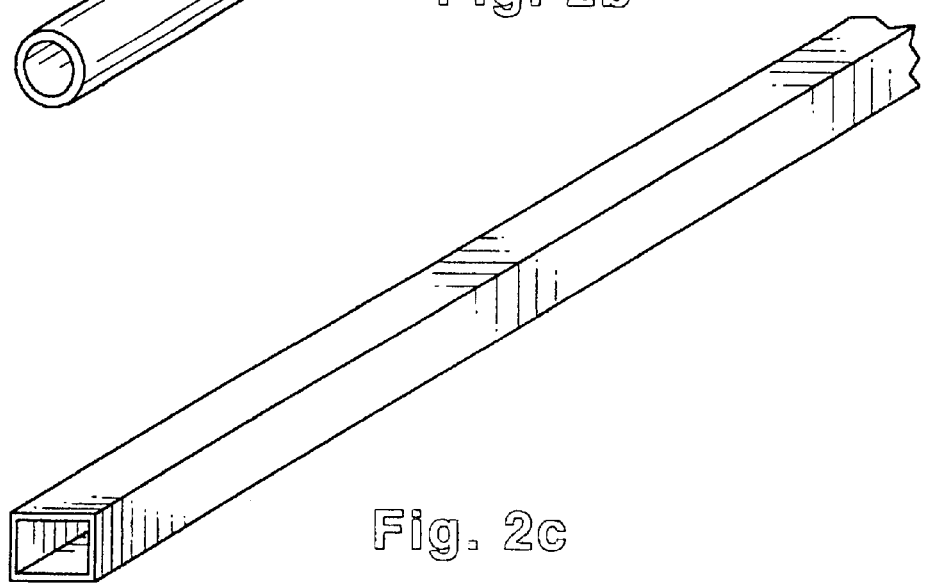
Figure 3A:
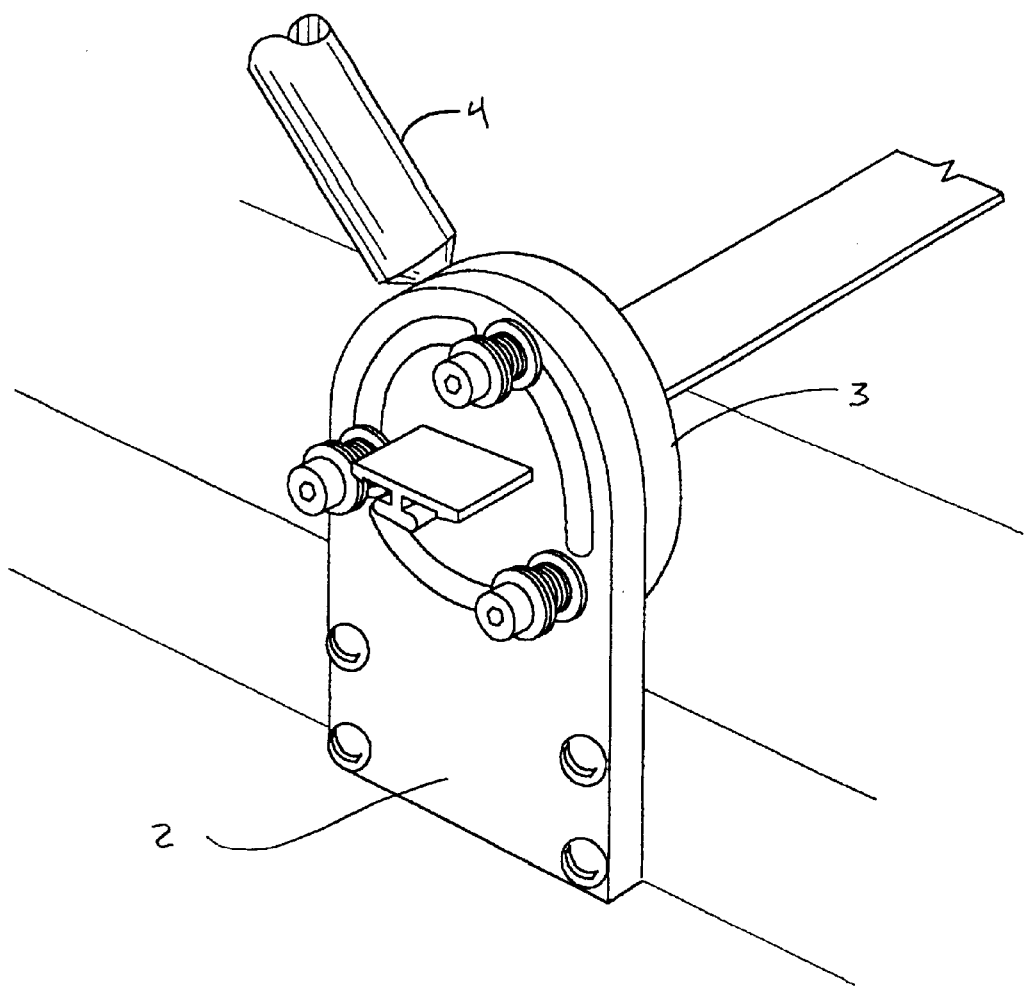
FIGS. 3a–3c illustrate examples of various shapes of materials, fully inserted into the rotary torsion cutting apparatus.
Figure 3B:
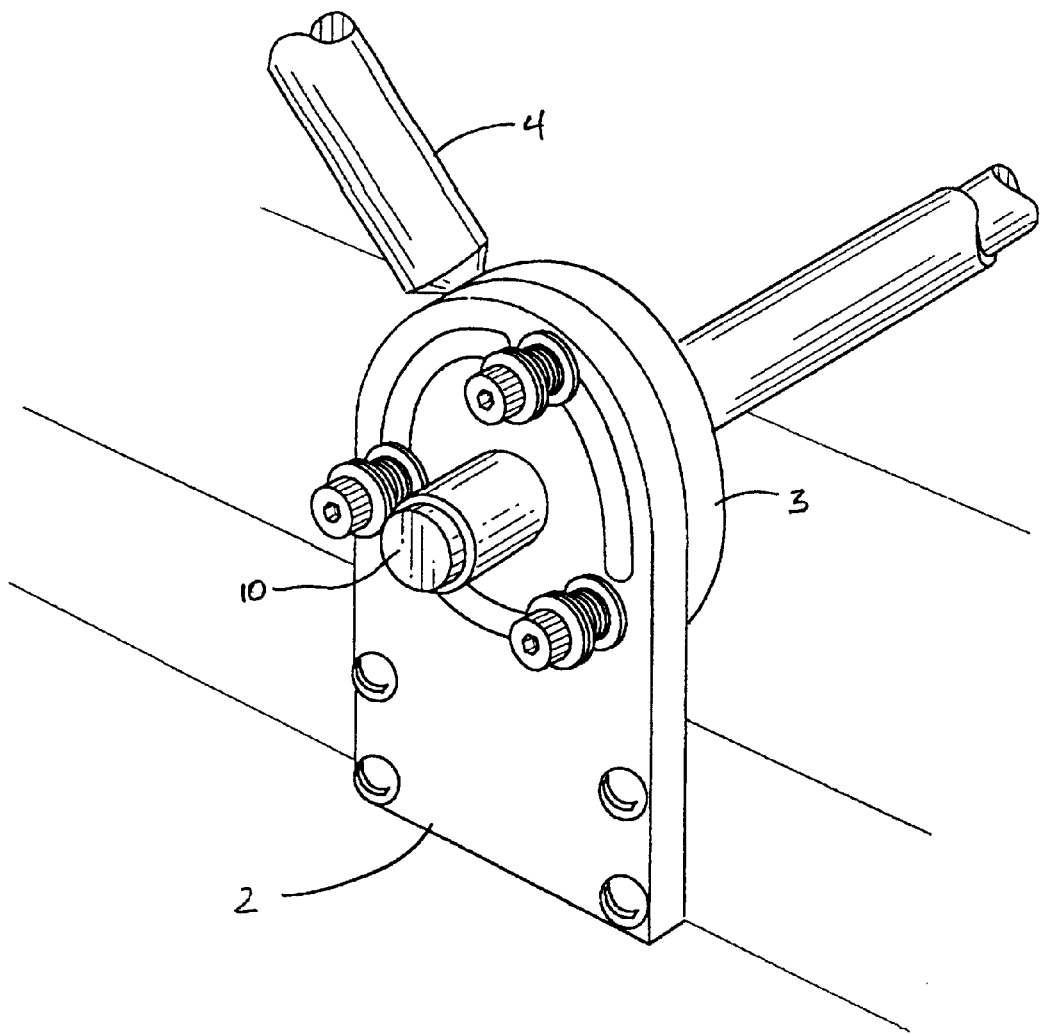
Figure 3C:
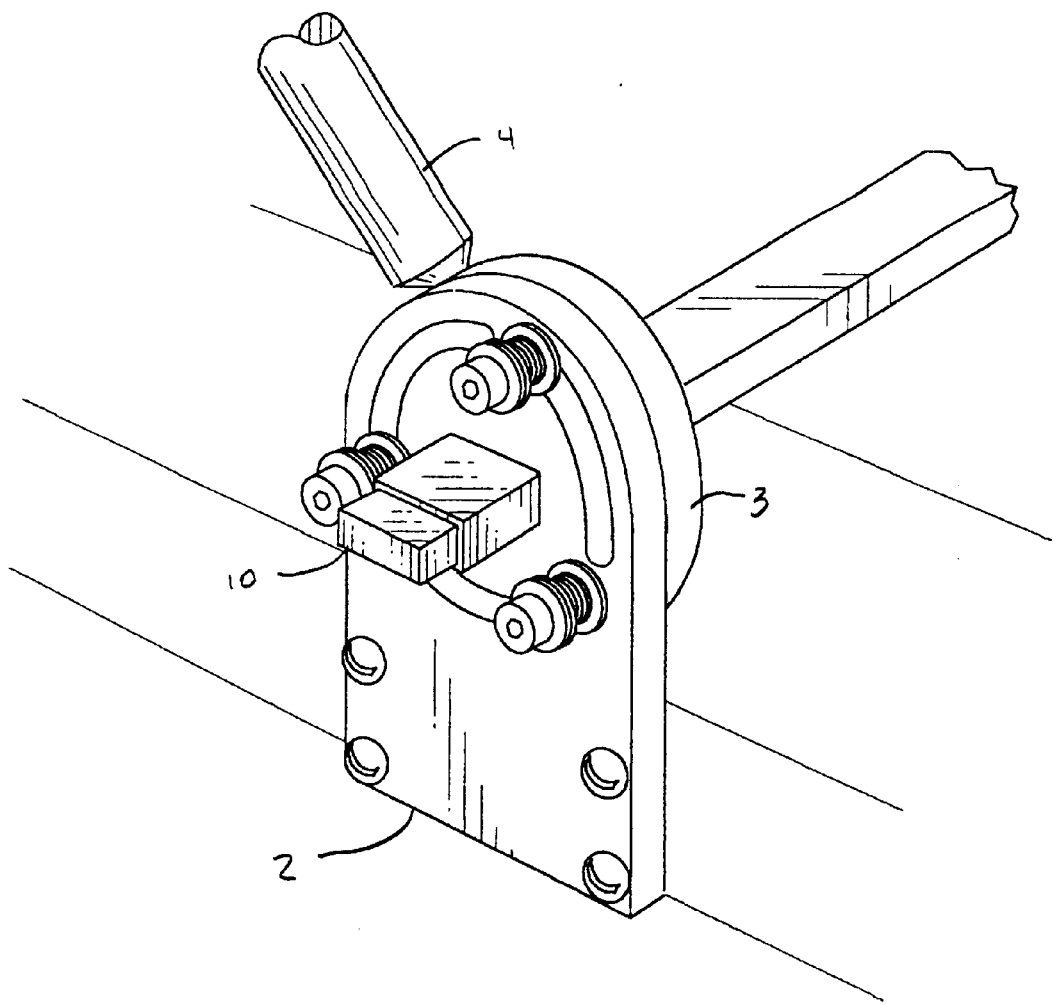
Figure 4A:
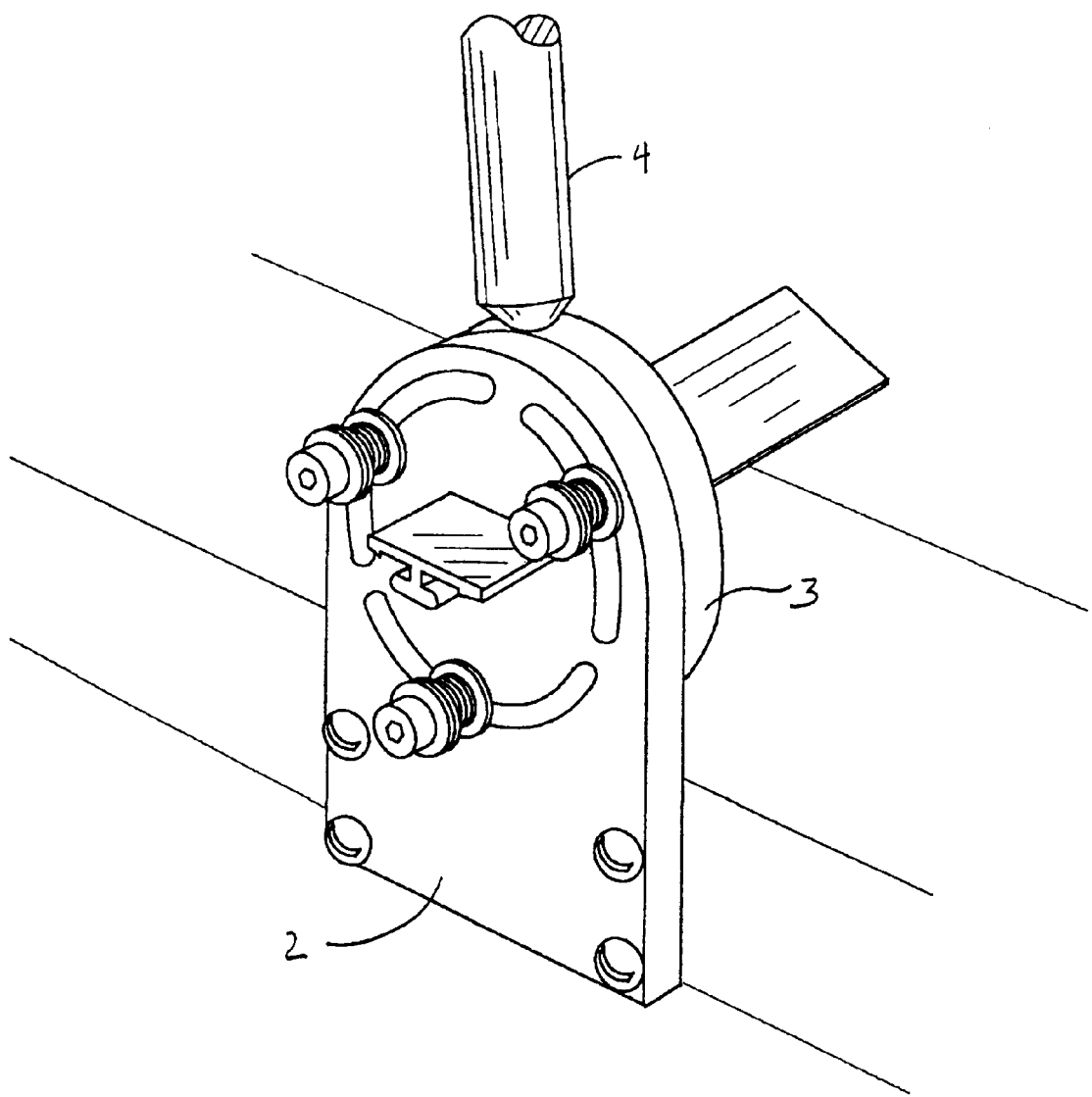
FIGS. 4a–4c depict rotation of the rotating plate member.
Figure 4B:
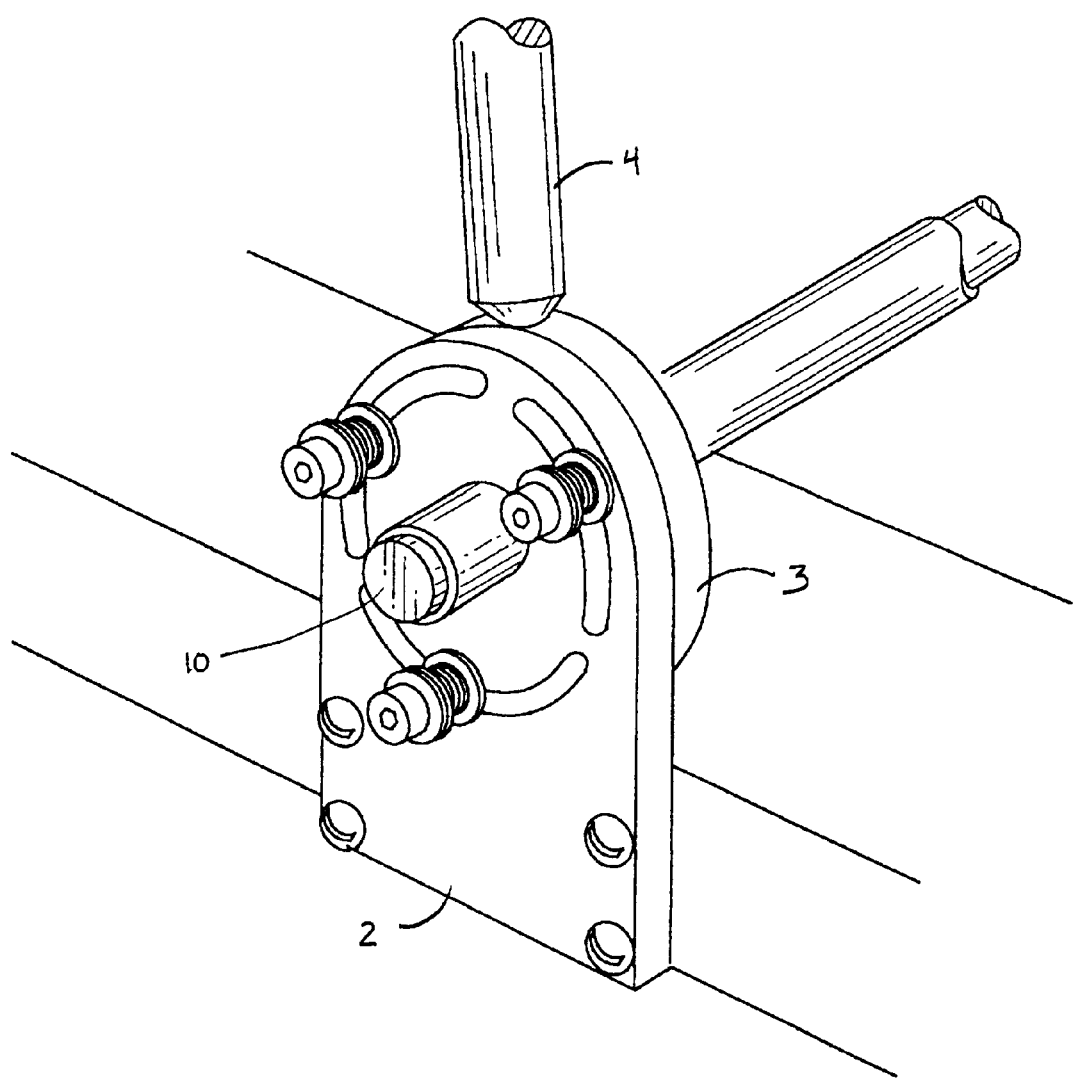
Figure 4C:
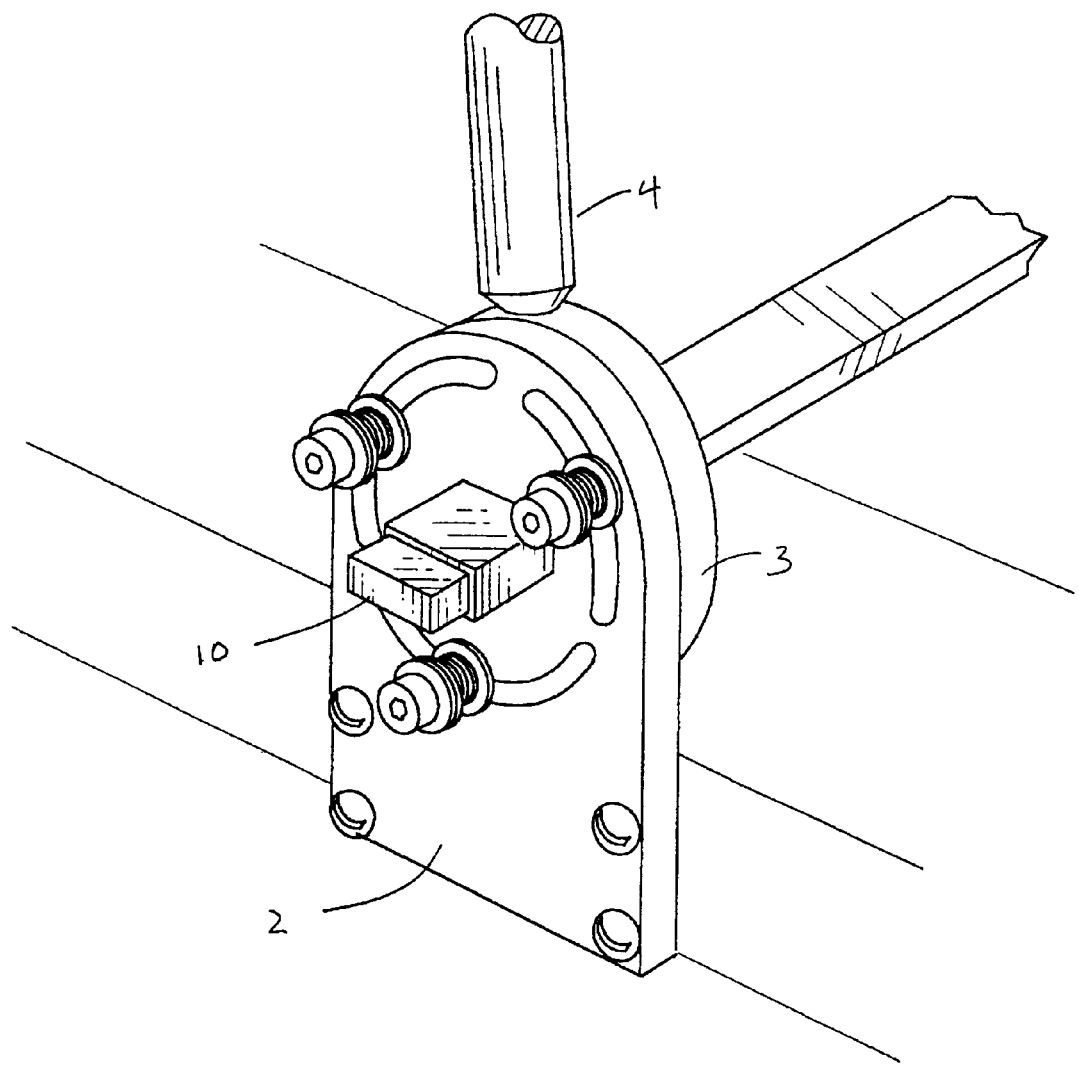
Figure 5A:
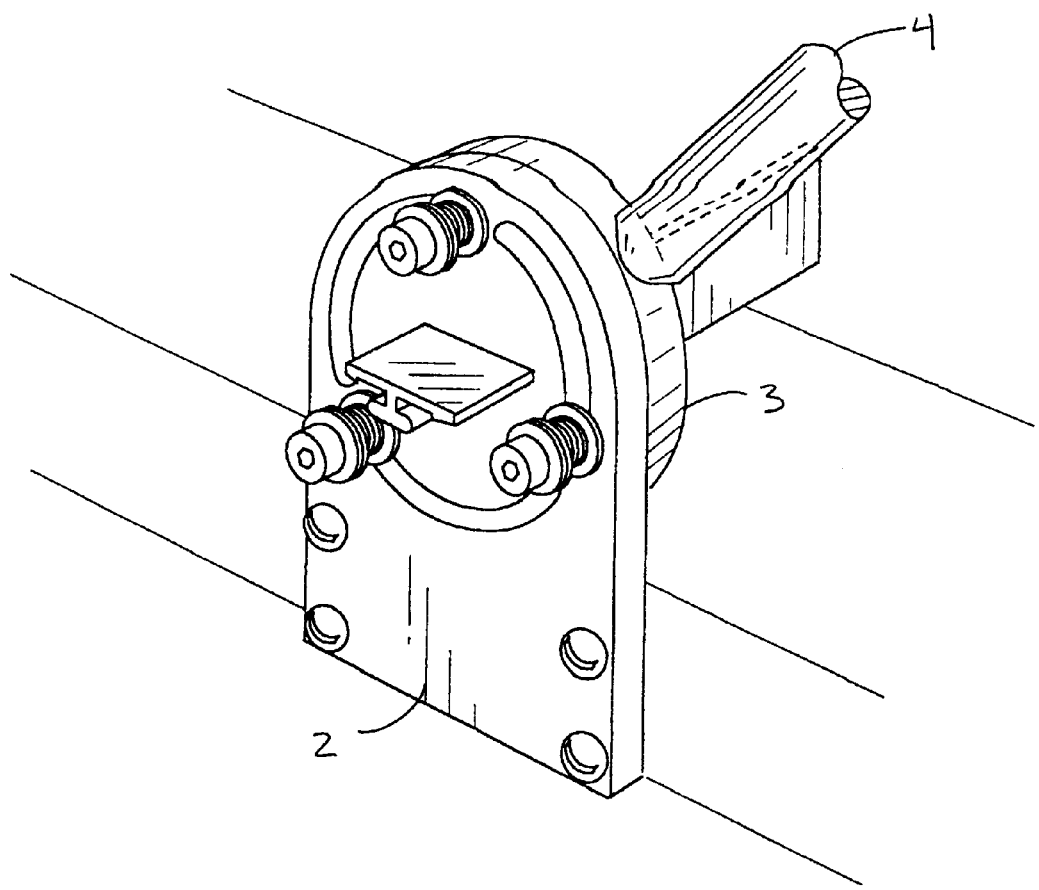
FIG. 5a–5c show the rotary torsion cutting apparatus of the present invention in its fully rotated position.
Figure 5B:
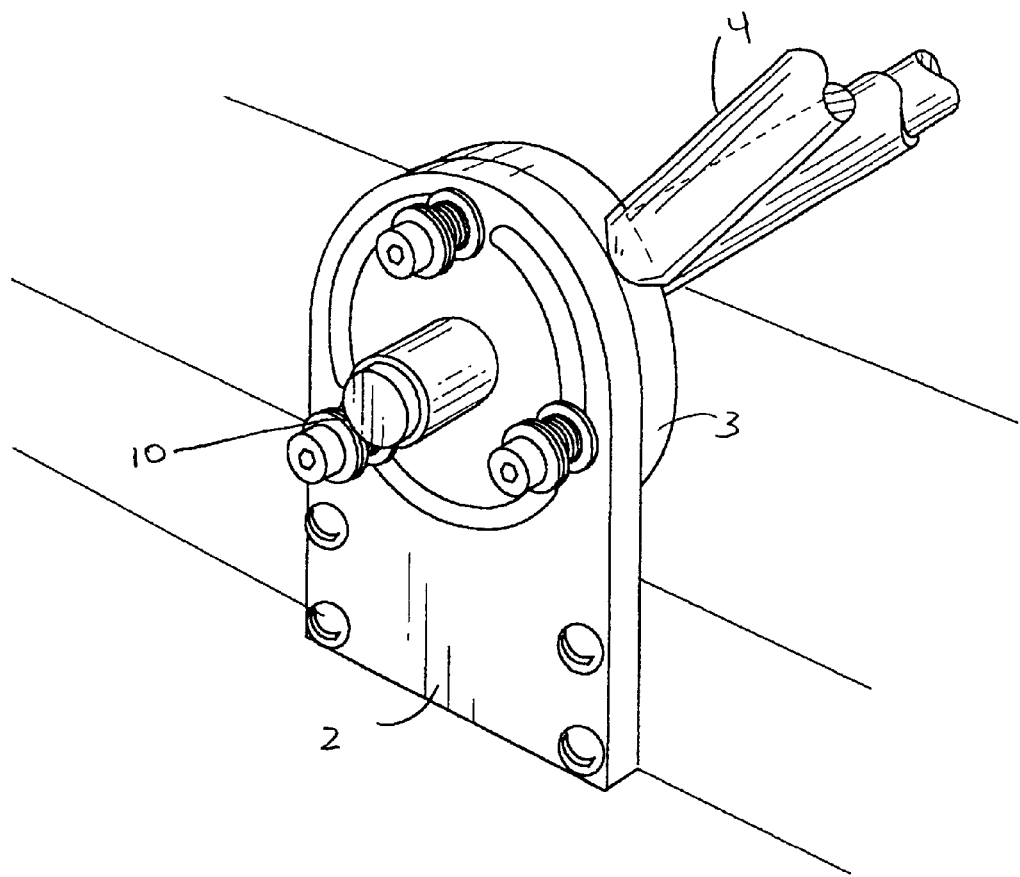
Figure 5C:
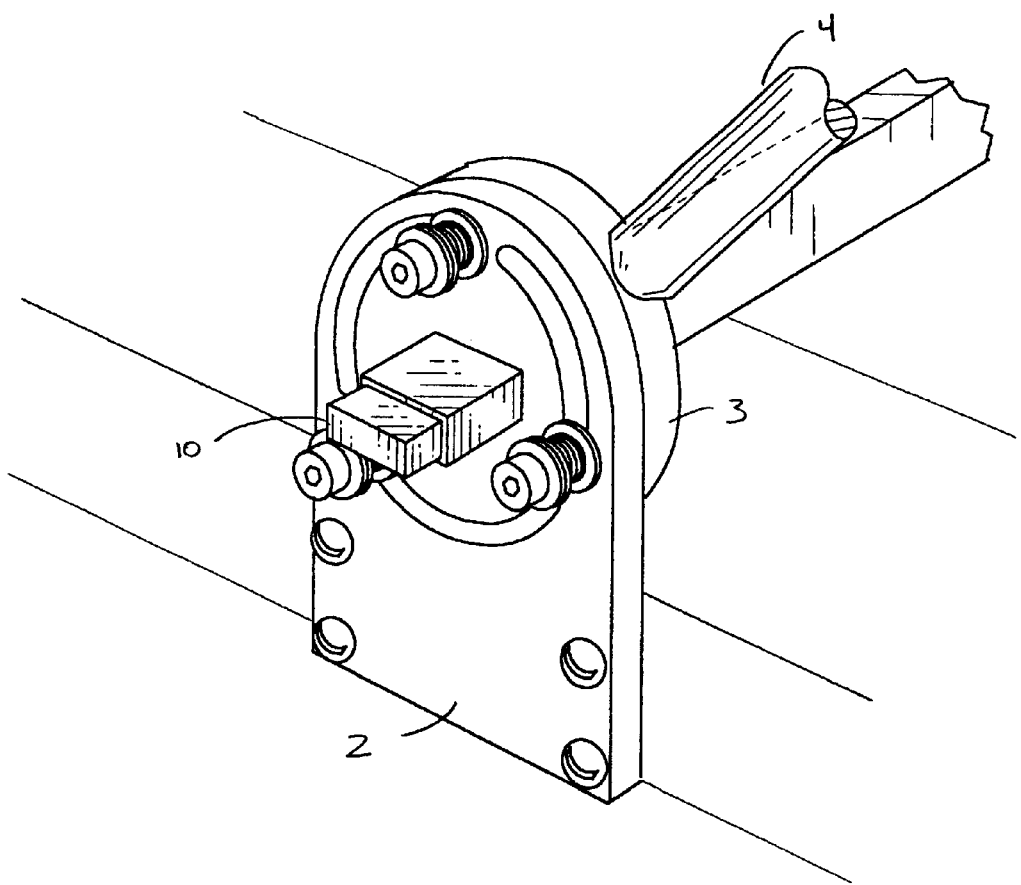
Figure 6A:
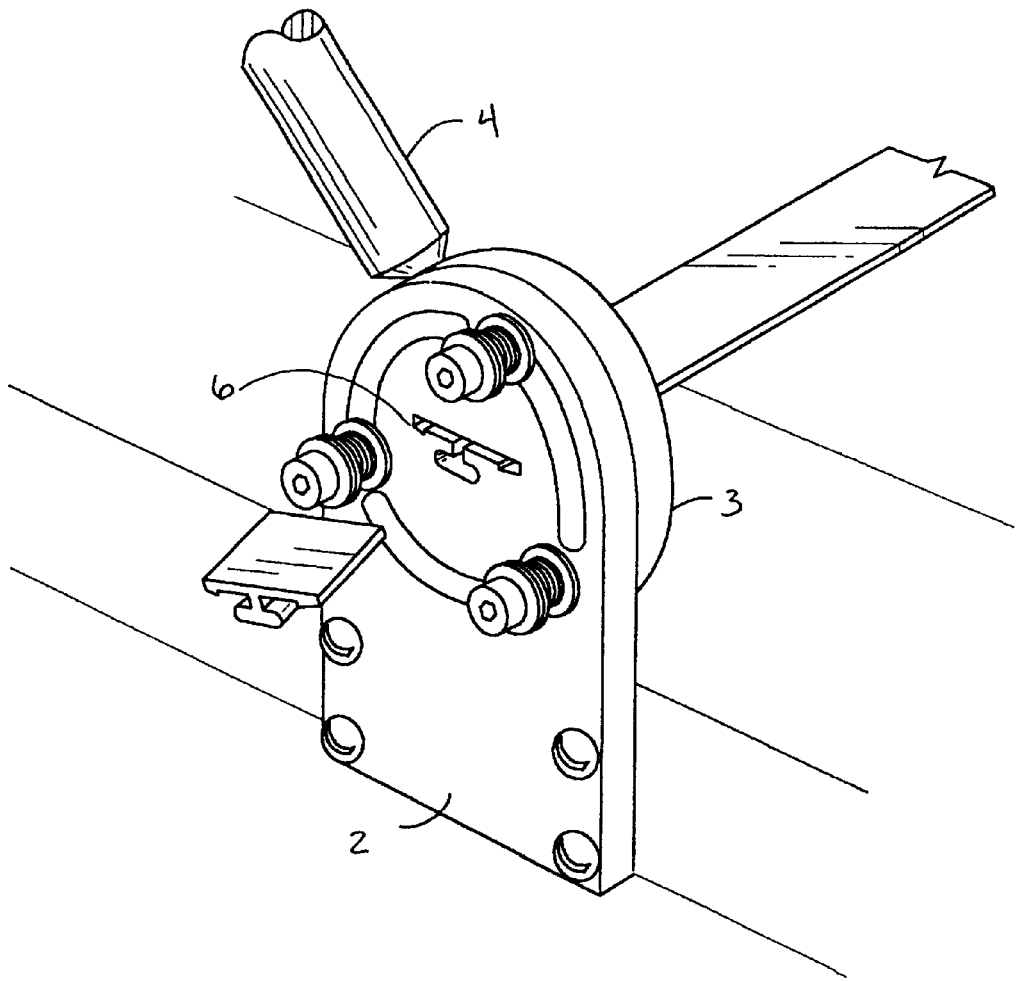
FIGS. 6a–6c show the removal of the cut pieces from the rotary torsion cutting apparatus of the present invention.
Figure 6B:
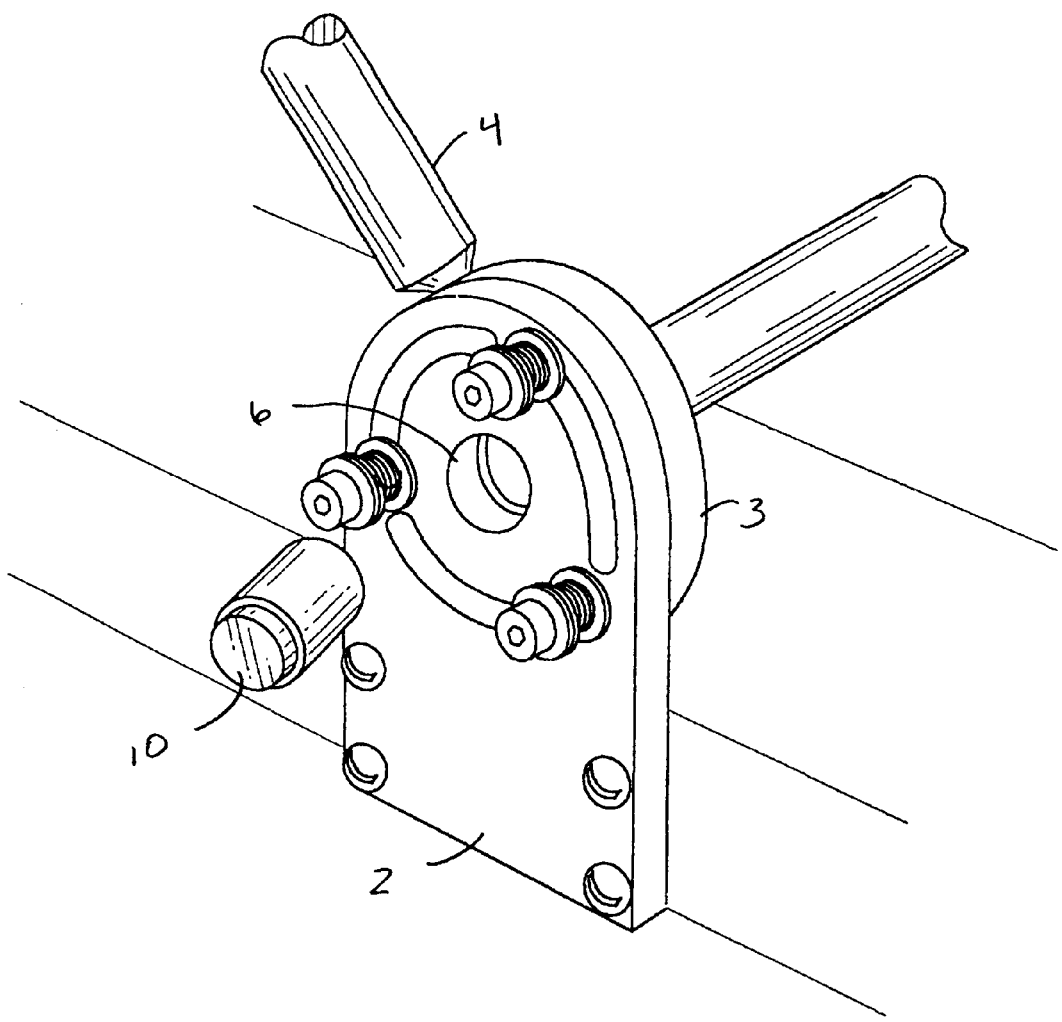
Figure 6C:
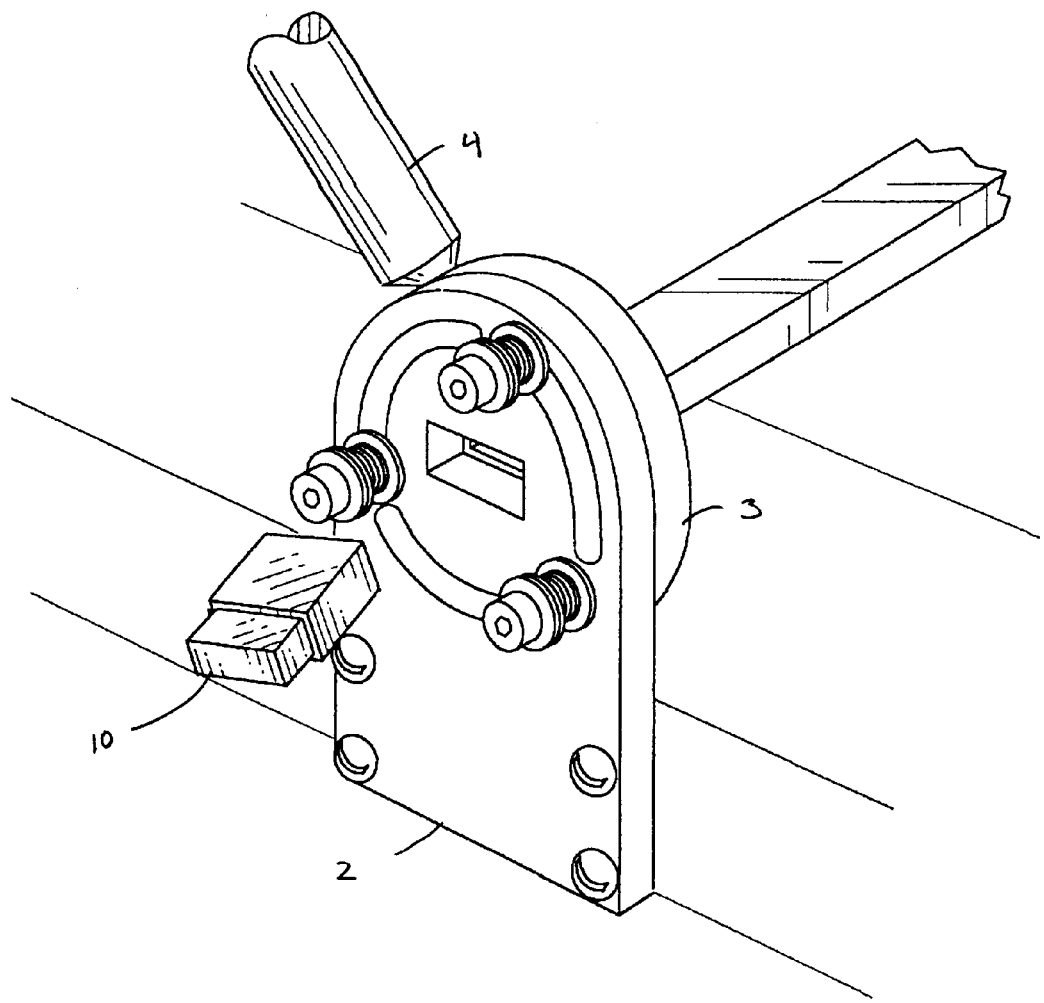

While it is not necessary for enabling purposes, the fixed (6) and pivot (9) openings of the present invention are tapered toward the point where the stationary plate member (2) is movably positioned next to the rotating plate member (3). The tapering of the fixed (6) and pivot (9) openings is shown in the partial cross section view depicted on FIG. 1a. Tapering allows a looser fit of the piece to be cut at the point of insertion. Although any amount of tapering could be employed, in the present invention, the fixed (6) and pivot (9) openings are between 0.025 and 0.035 inches and preferably 0.031 inches smaller at the center of the rotary torsion cutting apparatus. In order to facilitate the cutting of hollow objects such as tubes or PVC pipe, an insert (10) must be placed inside such object at cutting point. For example, FIG. 2b and 2c depict cutting stock that is either circular or rectangular in shape.

Figure 7:
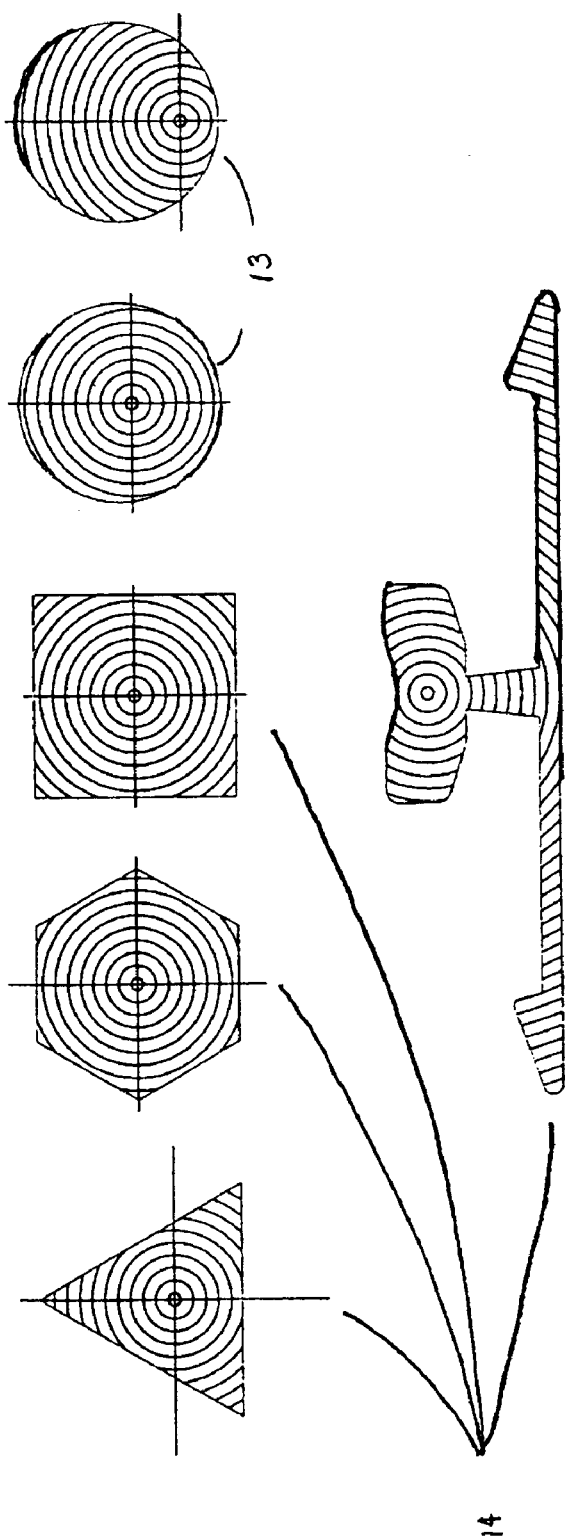
FIG. 7 depicts the cutting pattern of the present invention.

FIG. 7 illustrates the cutting pattern generated with the present invention both in the case where a slight offset is required (13) and when the inertial center coincides the rotational axis (14).

In order to prevent the sides of the cutting stock from becoming crushed during the cutting process, inserts (10), such as shown in 3b and 3c must be used. FIGS. 3–6, (a) through (c) inclusive, illustrate examples of various shapes of cutting stock being cut with the apparatus of the present invention.

While the present invention and its advantages have been described in detail, it should be understood that various changes, modifications and substitutions can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A rotary torsion cutting apparatus for cutting a relatively thin metal article without deformation, deflection or burring of the article being cut, comprising:

a stationary plate member having front, back and side faces, the stationary plate member further including a central axis;

a rotating plate member having front, back and side faces, the rotating plate member further including an axis of rotation aligned with the central axis of the stationary plate member;

a means to movably fasten the back face of the stationary plate member to the front face of the rotating plate member such that a zero gap exists between the stationary plate member and the rotating plate member, and the stationary plate member and the rotating plate member may be selectively rotated at least 90° relative to each other;

a fixed opening extending from the front face to the back face of the stationary plate member, the fixed opening being shaped and dimensioned for receiving an article to be cut by the rotary torsion cutting apparatus;

a pivot opening extending from the front face to the back face of the rotating plate member, the pivot opening being shaped and dimensioned for receiving an article to be cut by the rotary torsion cutting apparatus;

said fixed and pivot openings being of the same shape, and being aligned with the central axis of the stationary plate member and the axis of rotation of the rotating plate member such that the central axis and the axis of rotation extend through the fixed and pivot openings;

a means for aligning the center of said fixed opening with the center of said pivot opening;

a means for rotating the rotating plate member relative to the stationary plate member; and a means for stopping the rotation of the rotating plate member at a predetermined degree;

wherein relative movement between the stationary plate member and the rotating plate member causes a torsional cutting of an article positioned within the fixed opening and the pivot opening.

2. The rotary torsion cutting apparatus as in claim 1 wherein the predetermined degree of rotation is at least 90 degrees.

3. The rotary torsion cutting apparatus as in claim 1 wherein the means for rotation comprises a handle attached to the rotating plate member.

4. The rotary torsion cutting apparatus as in claim 3 wherein the handle is rotated using a motor.

5. The rotary torsion cutting apparatus as in claim 1 wherein the fixed opening is between 0.025 and 0.035 inches narrower at the back face of the stationary plate member than it is at the front face of said member and, the pivot opening is between 0.025 and 0.035 inches narrower at the front face of the rotating member than it is at the back face of such member.

6. The rotary torsion cutting apparatus as in claim 1 wherein the stationary and rotating plate members are cylindrical.

7. A rotary torsion cutting apparatus for cutting a relatively thin metal article without deformation, deflection or burring of the article being cut, comprising:

a stationary plate member having front, back and side faces, the stationary plate member further including a central axis;

a rotating plate member having front, back and side faces, the rotating plate member further including an axis of rotation aligned with the central axis of the stationary plate member;

a fixed opening extending from the front face to the back face of the stationary plate member, the fixed opening being shaped and dimensioned for receiving an article to be cut by the rotary torsion cutting apparatus;

a pivot opening extending from the front face to the back face of the rotating plate member, the pivot opening being shaped and dimensioned for receiving an article to be cut by the rotary torsion cutting apparatus;

the fixed and pivot openings being of the same shape, and being aligned with the central axis of the stationary plate member and the axis of rotation of the rotating plate member such that the central axis and the axis of rotation extend through the fixed and pivot openings;

a fastener movably attaching the back face of the stationary plate member to the front face of the rotating plate member such that a zero gap exists between the stationary plate member and the rotating plate member, the fastener further aligning the center of the fixed opening with the center of the pivot opening, and the stationary plate member and the rotating plate member are fastened such that they may be selectively rotated at least 90° relative to each other;

a handle coupled to the rotating plate member for use in rotating the rotating plate member relative to the stationary plate member; and a stop member interposed between the stationary plate member and the rotating plate member for stopping the rotation of the rotating plate member at a predetermined degree;

wherein relative movement between the stationary plate member and the rotating plate member causes a torsional cutting of an article positioned within the fixed opening and the pivot opening.

8. A rotary torsion cutting apparatus for cutting a relatively thin metal article without deformation, deflection or burring of the article being cut, comprising:

a stationary plate member having front, back and side faces, the stationary plate member further including a central axis;

a rotating plate member having front, back and side faces, the rotating plate member further including an axis of rotation aligned with the central axis of the stationary plate member;

a tapered fixed opening extending from the front face to the back face of the stationary plate member, the fixed opening being shaped and dimensioned for receiving an article to be cut by the rotary torsion cutting apparatus;

a tapered pivot opening extending from the front face to the back face of the rotating plate member, the pivot opening being shaped and dimensioned for receiving an article to be cut by the rotary torsion cutting apparatus;

the fixed and pivot openings being of the same shape, and being aligned with the central axis of the stationary plate member and the axis of rotation of the rotating plate member such that the central axis and the axis of rotation extend through the fixed and pivot openings;

a fastener movably attaching the back face of the stationary plate member to the front face of the rotating plate member such that a zero gap exists between the stationary plate member and the rotating plate member, the fastener further aligning the center of the fixed opening with the center of the pivot opening, and the stationary plate and the rotating plate are fastened such that they may be selectively rotated at least 90° relative to each other;

a handle coupled to the rotating plate member for use in rotating the rotating plate member relative to the stationary plate member; and a stop member interposed between the stationary plate member and the rotating plate member for stopping the rotation of the rotating plate member at a predetermined degree;

wherein relative movement between the stationary plate member and the rotating plate member causes a torsional cutting of an article positioned within the fixed opening and the pivot opening.

9. A method of torsional cutting using a rotary torsion cutting apparatus to cut a relatively thin metal article without deformation, deflection or burring of the article being cut, said rotary torsion cutting apparatus comprising a stationary plate member having front, back and side faces, the stationary plate member further including a central axis; a rotating plate member having front, back and side faces, the rotating plate member further including an axis of rotation aligned with the central axis of the stationary plate member; a means to movably fasten the back face of the stationary plate member to the front face of the rotating plate member such that a zero gap exists between the stationary plate member and the rotating plate member, and the stationary plate member and the rotating plate member may be selectively rotated at least 90° relative to each other; a fixed opening extending from the front face to the back face of the stationary plate member, the fixed opening being shaped and dimensioned for receiving an article to be cut by the rotary torsion cutting apparatus; a pivot opening extending from the front face to the back face of the rotating plate member, the pivot opening being shaped and dimensioned for receiving an article to be cut by the rotary torsion cutting apparatus; said fixed and pivot openings being of the same shape, and being aligned with the central axis of the stationary plate member and the axis of rotation of the rotating plate member such that the central axis and the axis of rotation extend through the fixed and pivot openings; a means for aligning the center of said fixed opening with the center of the pivot opening; and a means for rotating the rotating plate member relative to the stationary plate member; comprising the steps of inserting a piece to be cut into and through the fixed opening of the stationary plate member as well as into and through the pivot opening of the rotating plate member and rotating the rotating plate member relative to the stationary plate member until the piece to be cut is cut, wherein relative movement between the stationary plate member and the rotating plate member causes a torsional cutting of an article positioned within the fixed opening and the pivot opening.

10. The method of claim 9 wherein the rotary torsion cutting apparatus further comprising a means for stopping the rotation of the rotating plate member at a predetermined degree.

11. A method of torsional cutting using a rotary torsion cutting apparatus, said rotary torsion cutting apparatus comprising a stationary plate member having front, back and side faces, the stationary plate member further including a central axis; a rotating plate member having front, back and side faces, the rotating plate member further including an axis of rotation aligned with the central axis of the stationary plate member; a means to movably fasten the back face of the stationary plate member to the front face of the rotating plate member such that a zero gap exists between the stationary plate member and the rotating plate member; a fixed opening extending from the front face to the back face of the stationary plate member, the fixed opening being shaped and dimensioned for receiving an article to be cut by the rotary torsion cutting apparatus; a pivot opening extending from the front face to the back face of the rotating plate member, the pivot opening being shaped and dimensioned for receiving an article to be cut by the rotary torsion cutting apparatus; said fixed and pivot openings being of the same shape, and being aligned with the central axis of the stationary plate member and the axis of rotation of the rotating plate member such that the central axis and the axis of rotation extend through the fixed and pivot openings; a means for aligning the center of said fixed opening with the center of the pivot opening; and a means for rotating the rotating plate member relative to the stationary plate member; comprising the steps of inserting a piece to be cut into and through the fixed opening of the stationary plate member as well as into and through the pivot opening of the rotating plate member and rotating the rotating plate member relative to the stationary plate member until the piece to be cut is cut, wherein relative movement between the stationary plate member and the rotating plate member causes a torsional cutting of an article positioned within the fixed opening and the pivot opening.

12. The method of claim 9 Wherein the means for rotation comprises a handle attached to the rotating plate member.

13. The method of claim 9 wherein the fixed opening is between 0.025 and 0.035 inches narrower at the back face of the stationary plate member than it is at the front face of said member and, the pivot opening is between 0.025 and 0.035 inches narrower at the front face of the rotating member than it is at the back face of such member.

14. The method of claim 9 wherein the stationary and rotating plate members are cylindrical.

* * * * *